(12) United States Patent
Cosson et al.

(10) Patent No.: US 10,417,448 B2
(45) Date of Patent: Sep. 17, 2019

(54) MANAGEMENT OF SENSITIVE INFORMATION ACCESS AND USE

(71) Applicant: The Fin Exploration Company, San Francisco, CA (US)

(72) Inventors: Daniel Cosson, San Francisco, CA (US); Andrew Kortina, San Francisco, CA (US)

(73) Assignee: The Fin Exploration Company, San Francisco, CA (US)

( * ) Notice: Subject to any disclaimer, the term of this patent is extended or adjusted under 35 U.S.C. 154(b) by 106 days.

(21) Appl. No.: 15/472,159

(22) Filed: Mar. 28, 2017

(65) Prior Publication Data

US 2018/0285590 A1  Oct. 4, 2018

(51) Int. Cl.
*G06F 21/00* (2013.01)
*G06F 21/62* (2013.01)
(Continued)

(52) U.S. Cl.
CPC .......... *G06F 21/6245* (2013.01); *G06F 21/41* (2013.01); *G06F 21/6218* (2013.01); *G06F 21/6263* (2013.01); *G06Q 10/083* (2013.01); *G06Q 30/0617* (2013.01); *H04L 63/0428* (2013.01); *H04L 63/083* (2013.01); *H04L 63/0815* (2013.01); *H04L 63/102* (2013.01); *G06F 2221/2115* (2013.01)

(58) Field of Classification Search
CPC ..... H04L 67/02; H04L 67/2823; H04L 67/10; H04L 67/2804; H04L 67/2819
See application file for complete search history.

(56) References Cited

U.S. PATENT DOCUMENTS 8,239,926 B1 * 8/2012 Lin .................. H04W 4/21 726/7
8,769,642 B1 7/2014 O'Neill et al.
(Continued)

FOREIGN PATENT DOCUMENTS

CN  101022533  *  8/2007

OTHER PUBLICATIONS

AgileBits, Inc., "1Password," © 2017, [online], URL: <https://1password.com/>, Retrieved from the Internet Mar. 27, 2017, 7 pages.
(Continued)

*Primary Examiner* — Ghazal B Shehni
(74) *Attorney, Agent, or Firm* — Fish & Richardson P.C.

(57) ABSTRACT

Methods, systems, and apparatus, including computer programs encoded on computer storage media, sharing sensitive information with authorized individuals while reducing the likelihood that the sensitive information will be shared with unauthorized individuals. One of the methods includes receiving from a user an indication that a particular piece of information is sensitive information; automatically individually encrypting the sensitive information; automatically logging each access of the sensitive information; and reporting to the user that the sensitive information has been accessed, wherein the information management system to which the user indicates that a particular piece of information is sensitive information is the same information management system that reports to the user that the encrypted sensitive information has been accessed.

19 Claims, 7 Drawing Sheets

(51) Int. Cl.
*H04L 29/06* (2006.01)
*G06Q 10/08* (2012.01)
*G06Q 30/06* (2012.01)
*G06F 21/41* (2013.01)

(56) References Cited

U.S. PATENT DOCUMENTS

| | | |
|---|---|---|
| 9,531,719 B1 | 12/2016 | Sutton et al. |
| 2014/0007197 A1 | 1/2014 | Wray |
| 2014/0289508 A1* | 9/2014 | Wang ................ H04L 63/0853 |
| | | 713/155 |

OTHER PUBLICATIONS

LastPass, "Password Manager, Auto Form Filler, Random Password Generator & Secure Digital Wallet App," © 2017, [online], URL: <https://www.lastpass.com/2>, Retrieved from the Internet Mar. 27, 2017, 5 pages.

U.S. Bank National Association, "Online Banking, Account Alerts," © 2017, [online], URL: <https://www.usbank.com/online-banking/text-email-alerts.html>, retrieved from the Internet Mar. 27, 2017, 2 pages.

Soghoian, Christopher et al: "Merx: Secure and Privacy Preserving Delegated Payments", Apr. 6, 2009 (Apr. 6, 2009), Medical Image Computing and Computer-Assisted Intervention—MICCAI 2015: 18th International Conference, Munich, Germany, Oct. 5-9, 2015; Proceedings; [Lecture Notes in Computer Science; Lect.Notes Computer], Springer International Publishing, CH, XP047401584, ISSN: 0302-9743, ISBN: 978-3-642-16065-3.

International Search Report and Written Opinion of the International Searching Authority, PCT Application No. PCT/US2018/024591, dated Oct. 2, 2018, 17 pp.

* cited by examiner

MANAGEMENT OF SENSITIVE INFORMATION ACCESS AND USE

BACKGROUND

Technical Field

This specification relates generally to digital data processing, and more particularly, but not by way of limitation, to allowing authorized access to, or use of, sensitive user information while preventing unauthorized access.

Background

Security of sensitive information such as passwords is a significant concern. The incidences of identity theft, the fraudulent acquisition and use of a person's private identifying information, usually for financial gain, is on the rise. For example, phishing which includes the fraudulent practice of sending electronic communication purporting to be from a trustworthy source in order to induce individuals to reveal personal information, such as passwords and credit card numbers is at remarkably high levels. A need exists for a better way of protecting sensitive information, while still enabling authorized individuals to access it.

SUMMARY

This specification describes technologies for sharing sensitive information with authorized individuals for authorized purposes while reducing the likelihood that the sensitive information will be shared with unauthorized individuals.

In general, one innovative aspect of the subject matter described in this specification can be embodied in methods that include the actions of: receiving from a user an indication that a particular piece of information is sensitive information; automatically individually encrypting the sensitive information; automatically logging each access of the sensitive information; and reporting to the user that the sensitive information has been accessed, wherein the information management system to which the user indicates that a particular piece of information is sensitive information is the same information management system that reports to the user that the encrypted sensitive information has been accessed.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Reporting to the user that the sensitive information has been accessed can further include reporting to the user substantially in real-time relative to when the sensitive information has been accessed, reporting how often the sensitive information has been accessed, reporting identification information for the individual who accessed the sensitive information, and/or reporting the purpose for which the sensitive information has been accessed. Embodiments can include constraining access to the sensitive information to at least one authorized human agent; the authorized human agent can be a personal assistant who has been authorized by the user.

Embodiments can include receiving, at a user interface engine, a task request from a user that requires access to a third party service account for the user and the sensitive information can include the user's password for the third party service account. The task can involve purchasing an item and the method further can include preventing the personal assistant from shipping the purchased item to other than an address specified in the information management system. Embodiments can include obfuscating the sensitive information so that the human agent cannot see the sensitive information but can use the sensitive information for a third party service. Embodiments can include: receiving a request from a human agent to decrypt sensitive information of a user; decrypting the sensitive information; and forwarding the sensitive information to the human agent.

In general, another innovative aspect of the subject matter described in this specification can be embodied in methods that include the actions of: automatically logging in to a user's third party service account using a user's password for the third party service, wherein the user has provided the user's password for the third party service to the system; receiving, in response to the automatic login, a third party service account cookie; and automatically forwarding, at the system, the third party service account cookie to a computing device used by a human agent wherein the human agent can complete a task on behalf of the user without accessing the user's third party service password. In certain embodiments, access to the cookie expires after a predetermined period of time.

The subject matter described in this specification can be implemented in particular embodiments so as to realize one or more of the following advantages. Embodiments described in this specification allow users to share sensitive information with authorized individuals while reducing the likelihood that the sensitive information will be shared with unauthorized individuals. Certain embodiments allow busy individuals to share sensitive information with an assistant or set of assistants to allow the assistant(s) to accomplish tasks on behalf of the busy individual without the busy individual worrying about unauthorized use of the sensitive information. Certain Embodiments log an authorized individual's actions to tie the decryption of user sensitive information to a subsequent action taken by an authorized individual who accessed the sensitive information. Such logging helps to ensure the sensitive information is only being used in an authorized way (i.e., that the authorized individual only takes an action that was requested by the user in question).

For example, a user can ask a virtual personal assistant to purchase a gift for the birthday of the user's mother. With the user's permission, the virtual personal assistant system can access the user's previously stored and encrypted password for the user's account with an online store and the human agent assigned to assist the user with this task can complete the purchase of the transaction, in some cases without the personal assistant being made aware of the password and in some cases with the user being made aware that his password was accessed. Thus, embodiments described in this specification allow a user to safely share sensitive information with others.

Embodiments can store other types of sensitive information needed to fill out forms such as social security number, shipping and billing addresses, and payment information. Embodiments can keep audit log of every time each specific bit of user information is accessed by others, and for what reason, and provide at least a relevant portion of that audit log to the user. Certain embodiments require additional manager approval (e.g., for authentication) in order for a virtual assistant to unlock (and use) a user's sensitive information. One virtual assistant can add bits of information to be shared either with the user or with other virtual assistants acting on behalf of that user. For example, imagine a virtual assistant logs into a site on behalf of a user, and then is given a unique transaction or order code that is sensitive and might be needed in the future by the user or another virtual assistant working for that user.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes technologies for sharing sensitive information with authorized individuals while reducing the likelihood that the sensitive information will be shared with unauthorized individuals.

Figure 1:
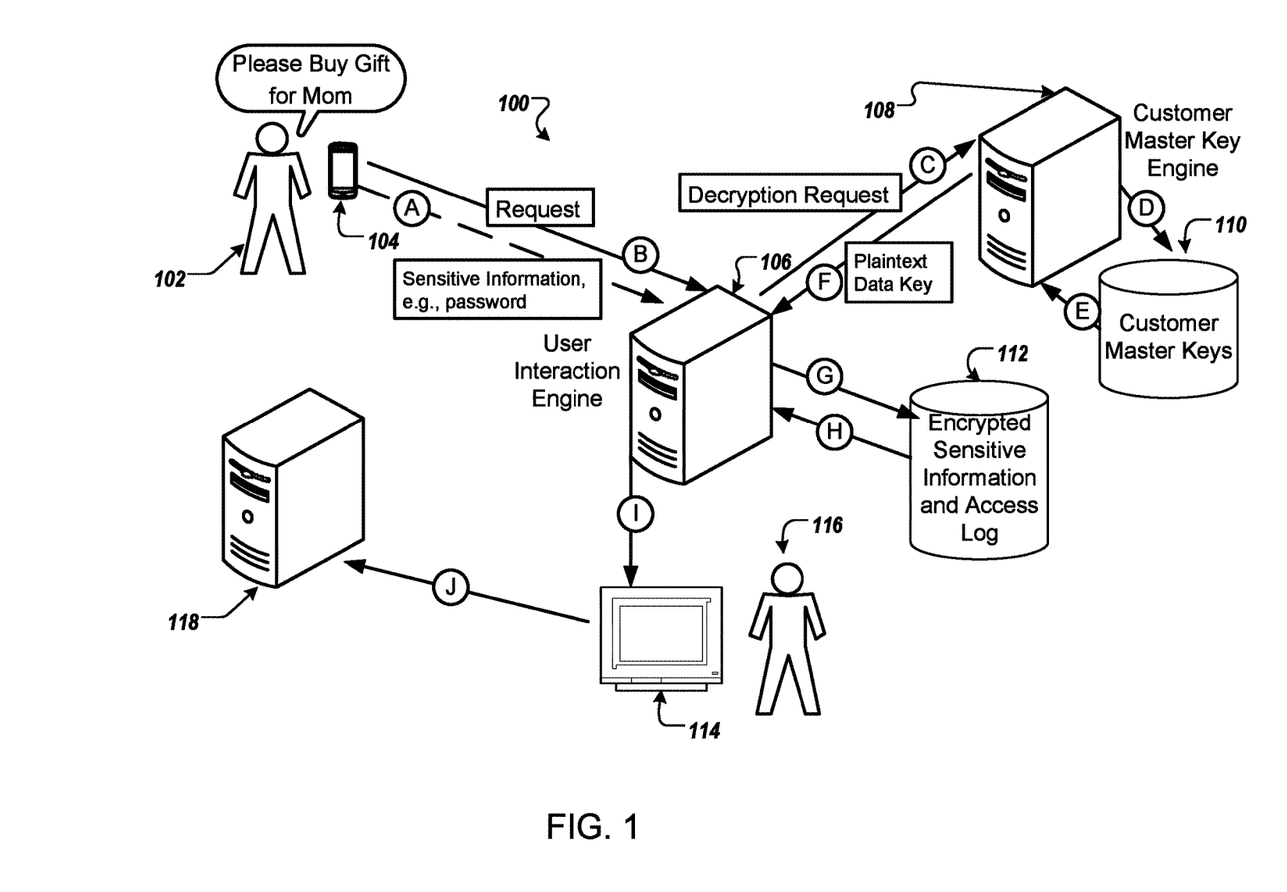
FIG. 1 is a diagram of an exemplary access management system for managing the sharing and/or use of sensitive information.

FIG. 1 shows an example access management system 100. In step A, a user 102 provides sensitive information to the system 100 via a computing device 104, e.g., a smartphone or a laptop or desktop computer with a secure internet connection. The sensitive information is encrypted by a user interaction engine 106 and stored in an encrypted sensitive information database 112.

A user can enter sensitive information through a secure form that is encrypted on client device before being uploaded to the system server and saving in the encrypted sensitive information database. Each piece of sensitive information is encrypted in a way that is auditable by a user so that the user can tell how often the sensitive information is accessed. Thus, a user who provides sensitive information can tell how often the sensitive information is accessed by another person and in some embodiments, the user can tell who accessed the information, when they accessed the information and for what purpose. Certain Embodiments log an authorized individual's actions to tie the decryption of user sensitive information to a subsequent action taken by an authorized individual who accessed the sensitive information. Such logging helps to ensure the sensitive information is only being used in an authorized way (i.e., that the authorized individual only takes an action that was requested by the user in question).

Sensitive information can be one or more of a variety of information such as information associated with logging in to a third party account or service (e.g., username and/or password information), credit card, passport, bank account, driver's license, social security number. The system encrypts the sensitive information. In certain embodiments, the sensitive information is sent over a secure HTTPS connection. Additionally, sensitive information can be encrypted on the client device the user is entering the sensitive information into by sending an encryption key from the server to the client device.

Some implementations use data keys to encrypt the sensitive information. Certain implementations use Advanced Encryption Standard (AES) a symmetric encryption algorithm in Galois/Counter Mode (GCM mode). GCM mode is a mode of operation for symmetric key cryptographic block ciphers that has been widely adopted because of its efficiency and performance.

The system can use a third party key management service. In such implementations the system can make an API request to the third party service to generate a data key and in response the third party service can return a plaintext copy of a data key and a cipher-text that contains the data key encrypted under a specified customer master key (CMK). The system can use the plaintext data key to encrypt the sensitive data, and it can store the encrypted data key alongside the encrypted data.

With reference again to FIG. 1, when a user 102 makes a request, e.g., "please buy a gift for my mom," in step B, the user interaction engine 106 receives the request and determines, or receives a determination, based on the request that the user's password for a specified online store is necessary to satisfy the request. In step C, the user interaction engine 106 sends a decryption request to decrypt the sensitive data, i.e., the relevant password. In other words, the user interaction engine 106 passes the relevant encrypted data key with an API request to a customer master key (CMK) engine 108 to decrypt the encrypted data key. The third party content management system, i.e., the CMK engine 108, uses the CMK to decrypt the data key into plaintext. More specifically, in step D, the CMK engine 108 sends a request to the CMK database 110 for the CMK for the encrypted data key. In step E the CMK engine 108 receives the CMK for the encrypted data key from the CMK database and decrypts the encrypted data key using the relevant CMK.

In step F, the CMK engine 108 returns the plaintext key to the user interaction engine 106. In step G, the user interaction engine 106 requests the relevant encrypted sensitive information from database 112. In step H, the user interaction engine 106 receives the encrypted sensitive information from database 112, uses the plaintext data key to decrypt the encrypted sensitive data, removes the plaintext data key from memory as soon as practical after use, and logs the access in database 112. In certain embodiments the following information, or a subset of the following information, is logged: the name or identification of the virtual assistant decrypting the sensitive information; the identifying code of the request the virtual assistant is decrypting the sensitive information for (e.g., the conversation/task where the virtual assistant needed to use the sensitive information to complete the task); the name or identification of the item being decrypted; and the date and time of the decryption.

In step I, the user interaction engine 106 forwards the decrypted sensitive information to computer 114 of the authorized human agent 116 and, in step J, the human agent completes the task, e.g., purchases a gift for the user's mother, via third party service 118.

Certain embodiments record when the human agent completes the task. If after a period of time the human agent does not complete the task or if there is no user request forming the basis of the human agents access of the user's sensitive information, the system flags the request for decryption, or the decryption itself if allowed, as potentially unauthorized.

Certain embodiments obfuscate sensitive information but allow a human personal assistant, e.g., a virtual assistant (VA), to copy the obfuscated sensitive information and put it into a third party service. One can achieve such obfuscation by using a 'bot', e.g., to login. The VA would send a uniform resource locator (URL) to a sensitive information encryption service as described in this specification, asking to login on behalf of the user. On the sensitive information encryption service server, there is a bot which has been programmed to fill out a login form with a username and password it can decrypt from the vault. The bot then sends back a session cookie (after successful logging in) to the VA device, and the VA device adds those cookies to a local browser, assuming a valid session.

Other embodiments could use other common encryption algorithms such as Blowfish, Twofish and a form of DES, e.g., triple DES.

In some implementations, the system generates one key for every user or one key for every item in the encrypted sensitive information database 112. The benefit of one key for every item is that external logging in the key management service can specify exactly which item is being encrypted/decrypted. In a one key per user approach, the key management service can log which user's key is being accessed but not which item of sensitive information. A system can rely on its internal logging of which particular item is being accessed to provide access reporting to a user.

In certain implementations, the keys reside in a protected environment with access controls giving access only to authorized administrators. Tiered access limits the who has access to a user's sensitive information, for example, in certain embodiments only a senior human agent, e.g., a senior virtual assistant, can complete tasks that require accessing a user's encrypted sensitive information but a junior or part-time agent can not.

Figure 2:
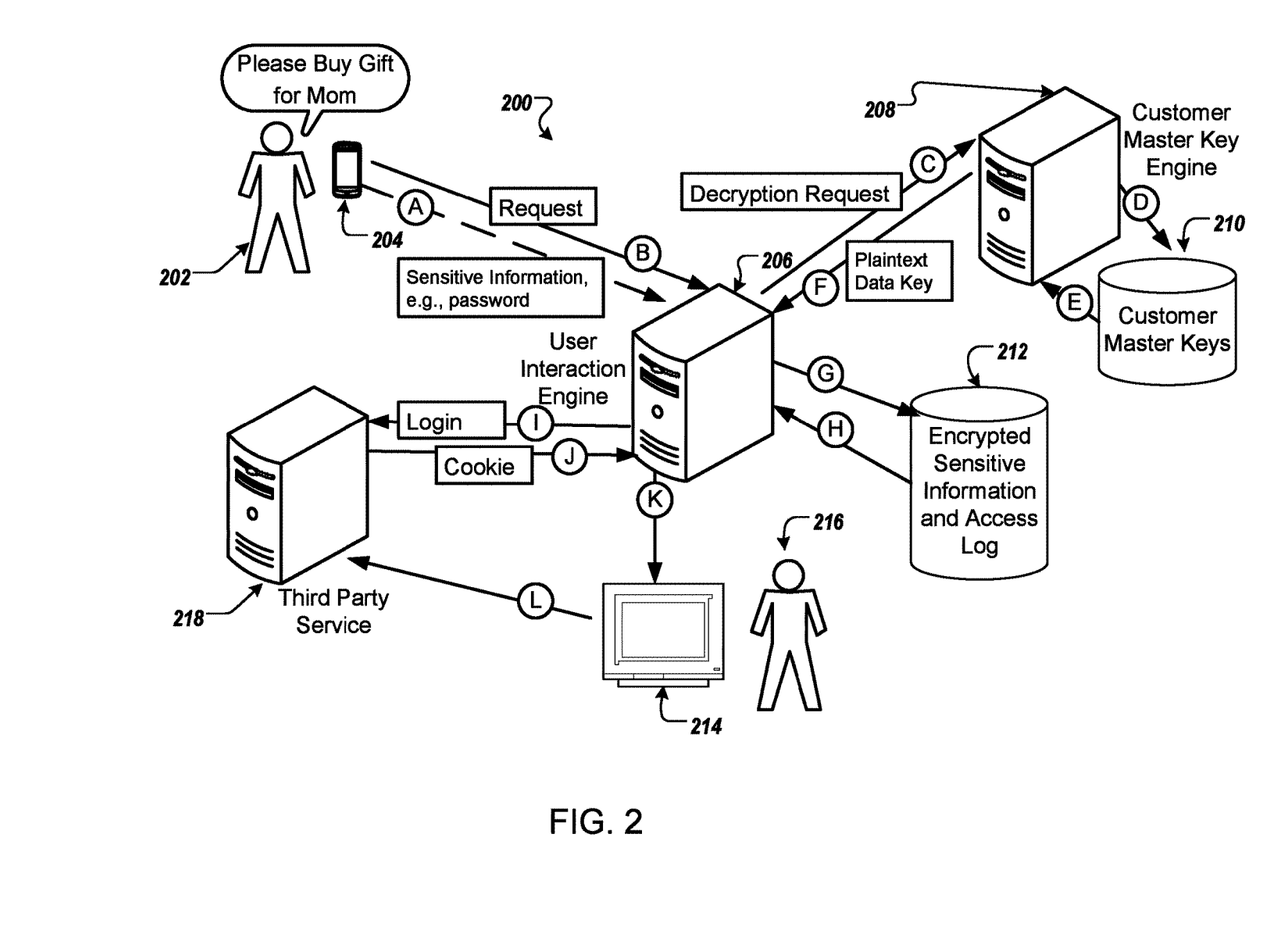
FIG. 2 is a diagram of an alternative embodiment of an access management system for managing the sharing and/or use of sensitive information.

FIG. 2 is a diagram of an alternative embodiment of an access management system for managing the sharing and/or use of sensitive information. In step A, a user 202 provides sensitive information to the system 200 via a computing device 204, e.g., a smartphone or a laptop or desktop computer with a secure internet connection. The sensitive information is encrypted by a user interaction engine 206 and stored in an encrypted sensitive information database 212. As noted above, a user can flag something as sensitive information by submitting it through a special submission form.

With reference again to FIG. 2, when a user 202 makes a request, e.g., "please buy a gift for my mom," in step B, the user interaction engine 206 receives the request and determines, or receives a determination, based on the request that the user's password for a specified online store is necessary to satisfy the request. In step C, the user interaction engine 206 sends a decryption request to decrypt the sensitive data, i.e., the relevant password. In other words, the user interaction engine 106 passes the relevant encrypted data key with an API request to a customer master key (CMK) engine 208 to decrypt the encrypted data key. The third party content management system, i.e., the CMK engine 208, uses the CMK to decrypt the data key into plaintext. More specifically, in step D, the CMK engine 208 sends a request to the CMK database 210 for the CMK for the encrypted data key. In step E the CMK engine 208 receives the CMK for the encrypted data key from the CMK database 210 and decrypts the encrypted data key using the relevant CMK.

In step F, the CMK engine 208 returns the plaintext key to the user interaction engine 106. In step G, the user interaction engine 206 requests the relevant encrypted sensitive information from database 212. In step H, the user interaction engine 206 receives the encrypted sensitive information from database 212, uses the plaintext data key to decrypt the encrypted sensitive data, removes the plaintext data key from memory as soon as practical after use, and in certain implementations logs the access in database 212.

In step I, the user interaction engine 206 forwards the decrypted sensitive information relevant to a third party service, e.g., a username and password, to the third party service 218 and, in step J, the user interaction engine 206 receives a session cookie back from the third party service. In step K, the session cookie is forwarded to the computer 214 of an authorized human agent 216 and in step L, the human agent 216 completes the task, e.g., purchases a gift for the user's mother, via third party service 118.

Certain embodiments record when the human agent completes the task. If after a period of time the human agent does not complete the task or if there is no user request forming the basis of the human agents access of the user's sensitive information, the system flags the request for decryption, or the decryption itself if allowed, as potentially unauthorized.

Figure 3:
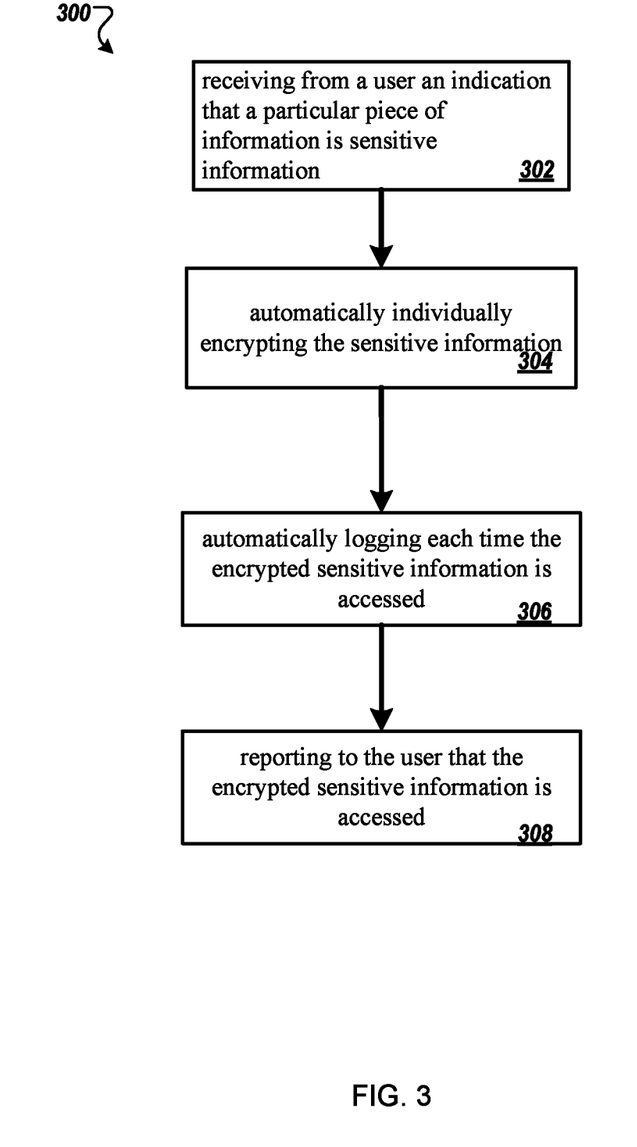
FIG. 3 is a flowchart of an exemplary method of sharing sensitive information.

FIG. 3 is a flowchart of an example method 300 for sharing sensitive information. For convenience, the method 300 will be described as being performed by a system of one or more computers, located in one or more locations, and programmed appropriately in accordance with this specification. For example, an access management system, e.g., the access management system 100 of FIG. 1, appropriately programmed, can perform the method 300.

Embodiments of the method include: receiving 302 from a user an indication that a particular piece of information is sensitive information; automatically individually encrypting 304 the sensitive information; automatically logging 306 each access of the sensitive information; and reporting 308 to the user that the sensitive information has been accessed, wherein the information management system to which the user indicates that a particular piece of information is sensitive information is the same information management system that reports to the user that the encrypted sensitive information has been accessed.

Figure 4:
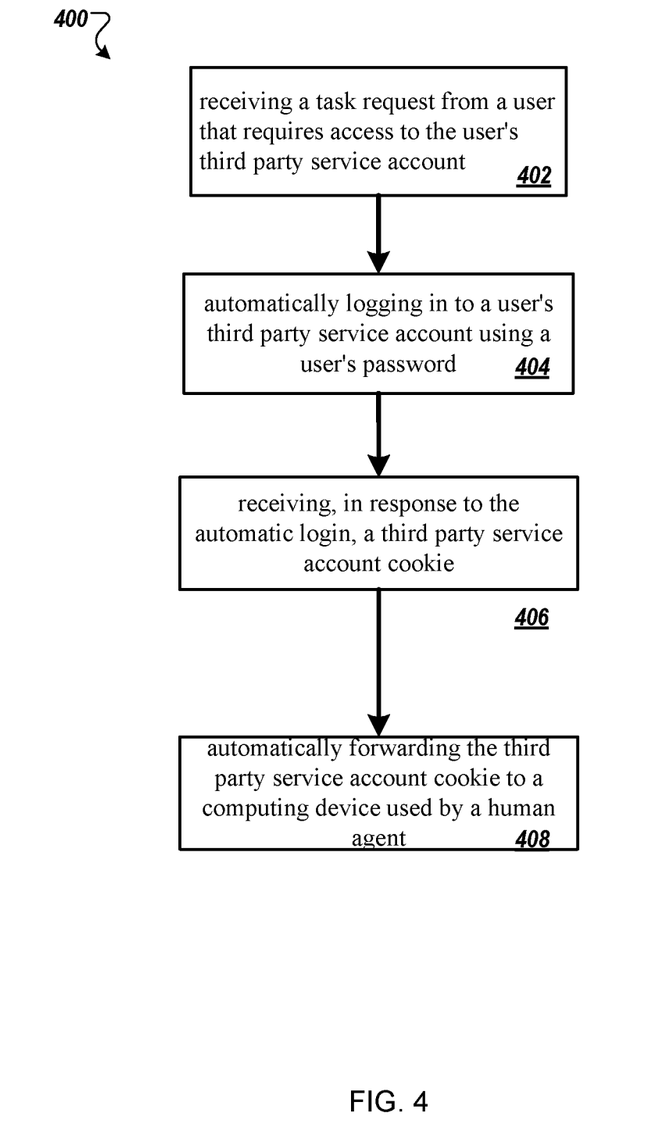
FIG. 4 is a flowchart of an alternative embodiment of a method of sharing sensitive information.

FIG. 4 is a flowchart of an alternative embodiment of a method of sharing sensitive information. In one example, the method 400 includes: receiving 402 a task request from a user that requires access to the user's third party service account; automatically logging in 404 to a user's third party service account using a user's password for the third party service; receiving 406, in response to the automatic login, a third party service account cookie; and automatically forwarding 408, at the system, the third party service account cookie to a computing device used by a human agent wherein the human agent can complete a task on behalf of the user without accessing the user's third party service password. In a more general implementation, the method does not require receiving a task request.

Figure 5:
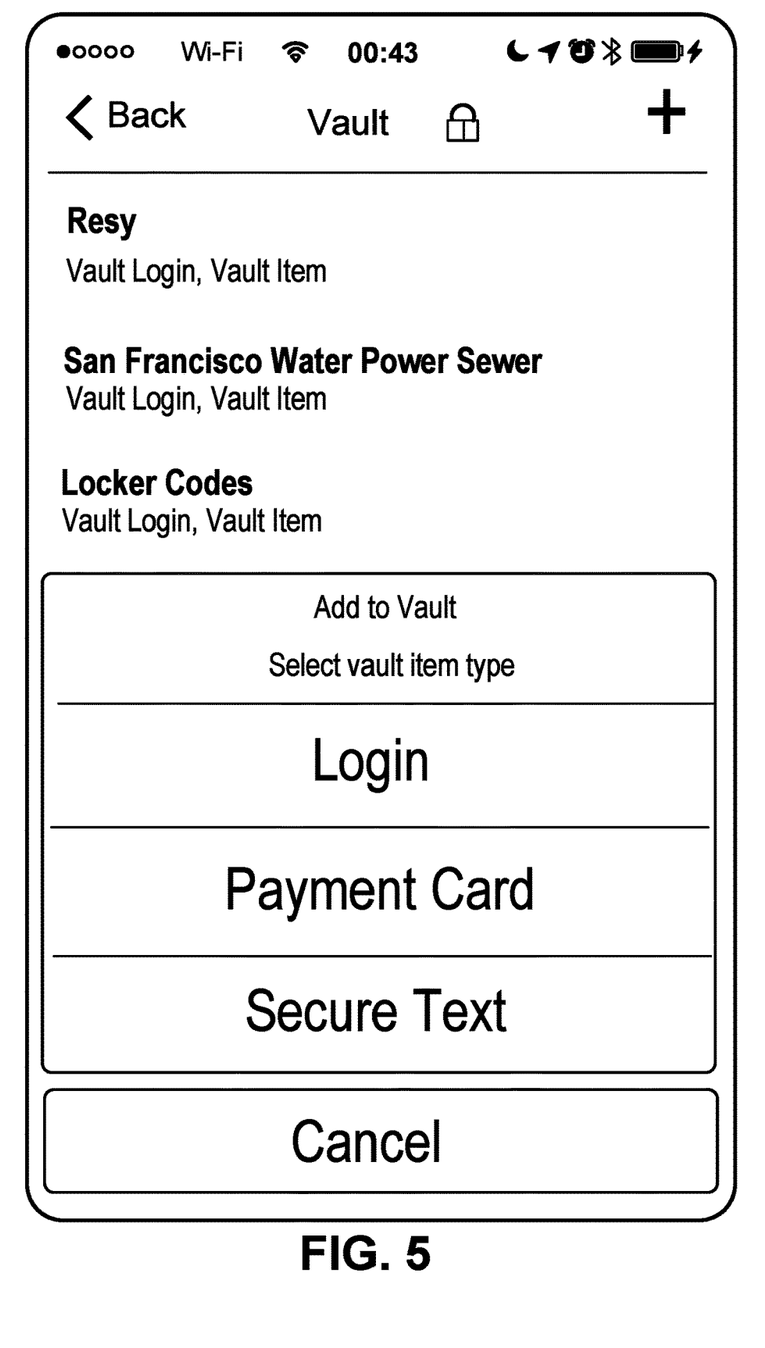
FIG. 5 is an illustration of a user interface prompting a user to select a type of sensitive information to submit to the system.
Figure 6:
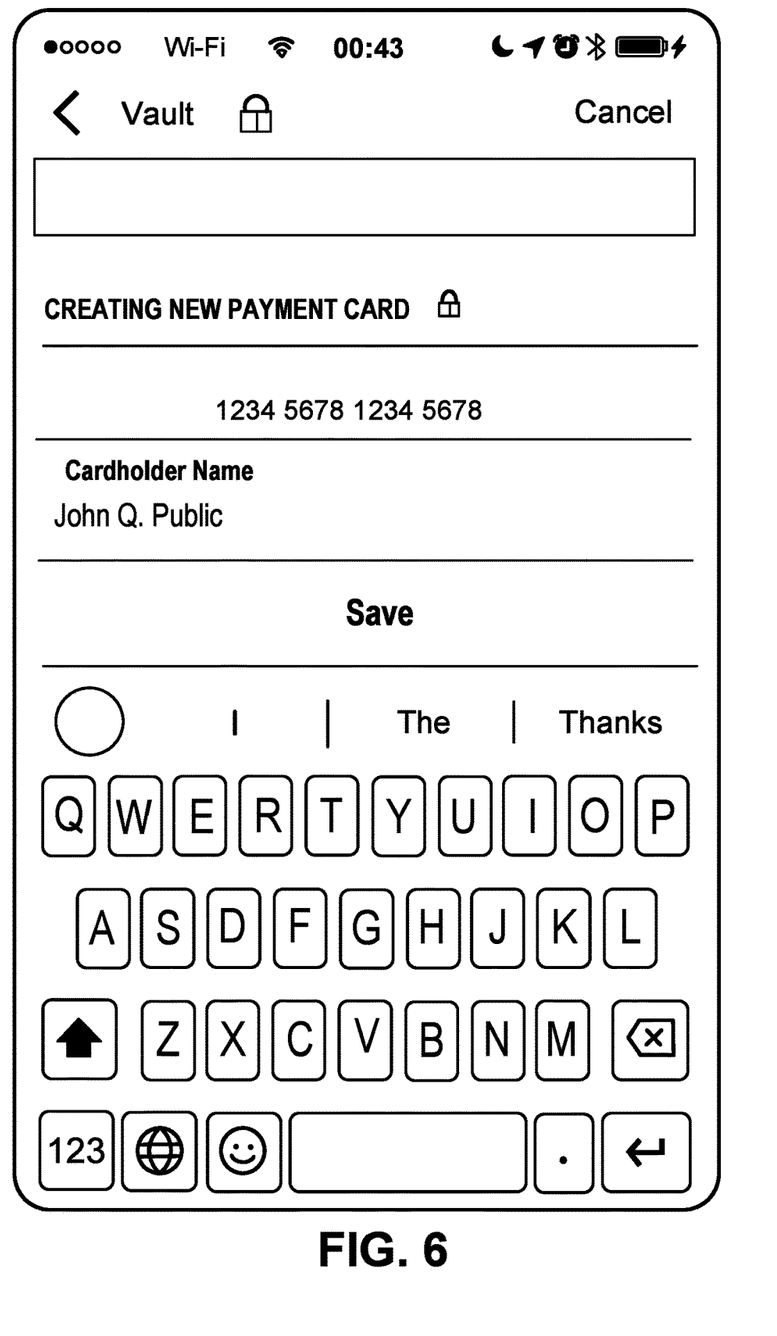
FIG. 6 is an illustration of a user interface prompting a user to submit login information.
Figure 7:
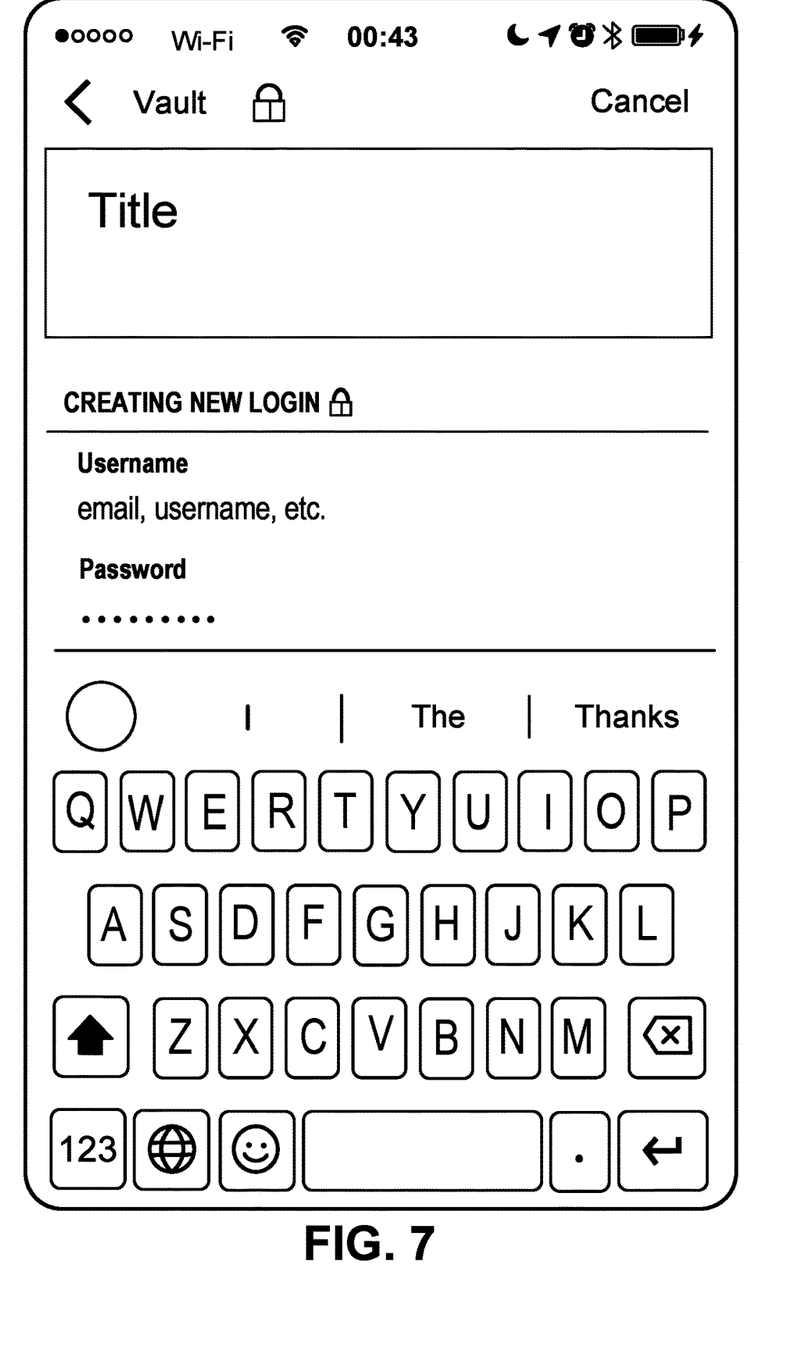
FIG. 7 is an illustration of a user interface prompting a user to submit payment card information.

FIG. 5 is an illustration of a user interface prompting a user to select a type of sensitive information to submit to the system. The user interface prompts the user to select among various types of sensitive information, e.g., login, payment card, or secure text, that the user wants to submit to the system. The user may want to submit the sensitive information to the system to allow a virtual personal assistant to complete a task on behalf of the user. FIG. 6 is an illustration of a user interface prompting a user to submit login information. The login information can include a username and password. Similarly, FIG. 7 is an illustration of a user interface prompting a user to submit payment card information. The payment card information can include the card number, the cardholder's name, and possibly the billing address, the card's security code or cvv number, the cardholder's phone number and/or the cardholder's email address.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In this specification, the term "database" is used broadly to refer to any collection of data: the data does not need to be structured in any particular way, or structured at all, and it can be stored on storage devices in one or more locations.

An electronic document, which for brevity will simply be referred to as a document, may, but need not, correspond to a file. A document may be stored in a portion of a file that holds other documents, in a single file dedicated to the document in question, or in multiple coordinated files.

In this specification, the term "database" will be used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method in an information management system, the method comprising:
    receiving, at a user interface engine, a task request from a user that requires access to a third party service account of the user;
    automatically logging in to the third party service account of the user using a user's password for the third party service account, wherein the user has provided the user's password for the third party service account to the system;
    receiving, in response to the automatic login, a third party service account cookie; and
    automatically forwarding, at the system, the third party service account cookie to a computing device used by a human agent wherein the human agent can complete a task on behalf of the user without accessing the user's third party service password, wherein the task involves purchasing an item and wherein the method further comprises preventing the human agent from shipping the purchased item to an address other than an address specified in the information management system.

2. The computer-implemented method of claim 1, wherein access to the cookie expires after a predetermined period of time.

3. The computer-implemented method of claim 1, the method further comprising:
    (a) receiving from a user an indication that a particular piece of information is sensitive information;
    (b) automatically encrypting the sensitive information;
    (c) automatically logging each access of the sensitive information; and
    (d) reporting to the user that the sensitive information has been accessed including when the sensitive information is accessed by an authorized individual, wherein the information management system to which the user indicates that a particular piece of information is sensitive information is the same information management system that reports to the user that the encrypted sensitive information has been accessed.

4. The computer-implemented method of claim 3, wherein reporting to the user that the sensitive information has been accessed further comprises reporting to the user substantially in real-time relative to when the sensitive information has been accessed.

5. The computer-implemented method of claim 3, wherein reporting to the user that the sensitive information has been accessed further comprises reporting how often the sensitive information has been accessed.

6. The computer-implemented method of claim 3, wherein reporting to the user that the sensitive information has been accessed further comprises reporting identification information for the individual who accessed the information.

7. The computer-implemented method of claim 3, wherein reporting to the user that the sensitive information has been accessed further comprises reporting a purpose for which the sensitive information has been accessed.

8. The computer-implemented method of claim 3, wherein the method further comprises constraining access to the sensitive information to at least one authorized human agent.

9. The computer-implemented method of claim 8, wherein the authorized human agent is a personal assistant who has been authorized by the user.

10. The computer-implemented method of claim 9, wherein the method further comprises receiving, at a user interface engine, a task request from a user that requires access to a third party service account for the user and wherein the sensitive information includes the user's password for the third party service account.

11. The computer-implemented method of claim 9, wherein the task involves purchasing an item and wherein the method further comprises preventing the personal assistant from shipping the purchased item to other than an address specified in the information management system.

12. The computer-implemented method of claim 3 wherein the method further comprises obfuscating the sensitive information so that the human agent cannot see the sensitive information but can use the sensitive information for a third party service.

13. The computer-implemented method of claim 3 wherein the method further comprises
    (a) receiving a request from a human agent to decrypt sensitive information of a user;
    (b) decrypting the sensitive information; and
    (c) forwarding the sensitive information to the human agent.

14. A system comprising:
    one or more computers and one or more storage devices on which are stored instructions that are operable, when executed by the one or more computers, to cause the one or more computers to perform operations comprising:
    receiving, at a user interface engine, a task request from a user that requires access to a third party service account of the user;
    automatically logging in to the third party service account of the user using a user's password for the third party service account, wherein the user has provided the user's password for the third party service account to the system;
    receiving, in response to the automatic login, a third party service account cookie; and
    automatically forwarding, at the system, the third party service account cookie to a computing device used by a human agent wherein the human agent can complete a task on behalf of the user without accessing the user's third party service password, wherein the task involves purchasing an item and wherein the operations further comprise preventing the human agent from shipping the purchased item to an address other than an address specified in an information management system;
    receiving from a user an indication that a particular piece of information is sensitive information;
    automatically encrypting the sensitive information;
    automatically logging each access of the sensitive information; and
    reporting to the user that the sensitive information has been accessed including when the sensitive information is accessed by an authorized individual.

15. The system of claim 14, wherein reporting to the user that the sensitive information has been accessed further comprises reporting to the user substantially in real-time relative to when the sensitive information has been accessed.

16. The system of claim 14, wherein reporting to the user that the sensitive information has been accessed further comprises reporting how often the sensitive information has been accessed.

17. The system of claim 14, wherein reporting to the user that the sensitive information has been accessed further comprises reporting identification information for the individual who accessed the information.

18. The system of claim 14, the operations further comprising:
    (a) receiving a request from a human agent to decrypt sensitive information of a user;
    (b) decrypting the sensitive information; and
    (c) forwarding the sensitive information to the human agent.

19. A system comprising:
    one or more computers and one or more storage devices on which are stored instructions that are operable, when executed by the one or more computers, to cause the one or more computers to perform operations comprising:
    receiving, at a user interface engine, a task request from a user that requires access to a third party service account of the user;
    automatically logging in to the third party service account of the user using a user's password for the third party service account, wherein the user has provided the user's password for the third party service account to the system;
    receiving, in response to the automatic login, a third party service account cookie; and
    automatically forwarding, at the system, the third party service account cookie to a computing device used by a human agent wherein the human agent can complete a task on behalf of the user without accessing the user's third party service password, wherein the task involves purchasing an item and wherein the operations further comprise preventing the human agent from shipping the purchased item to an address other than an address specified in an information management system.

* * * * *